United States Patent
Holt et al.

(10) Patent No.: US 7,032,125 B2
(45) Date of Patent: Apr. 18, 2006

(54) METHOD FOR LOOSELY COUPLING METADATA AND DATA IN A STORAGE ARRAY

(75) Inventors: Keith W. Holt, Wichita, KS (US); William P. Delaney, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 206 days.

(21) Appl. No.: 10/131,940

(22) Filed: Apr. 25, 2002

(65) Prior Publication Data

US 2003/0204670 A1    Oct. 30, 2003

(51) Int. Cl.
  *G06F 11/00*    (2006.01)
  *G06F 13/00*    (2006.01)
(52) U.S. Cl. .................... 714/6; 714/766; 714/770; 711/114
(58) Field of Classification Search ............. 711/114, 711/113; 714/6, 7, 770
See application file for complete search history.

(56) References Cited

U.S. PATENT DOCUMENTS

| | | | | |
|---|---|---|---|---|
| 5,390,327 | A | * | 2/1995 | Lubbers et al. ............... 714/7 |
| 5,574,851 | A | * | 11/1996 | Rathunde ....................... 714/7 |
| 5,774,643 | A | * | 6/1998 | Lubbers et al. ............... 714/20 |
| 5,826,001 | A | * | 10/1998 | Lubbers et al. ............... 714/6 |
| 6,148,368 | A | * | 11/2000 | DeKoning ................... 711/113 |
| 6,378,038 | B1 | * | 4/2002 | Richardson et al. ......... 711/114 |
| 6,389,432 | B1 | * | 5/2002 | Pothapragada et al. ...... 707/205 |
| 6,530,004 | B1 | * | 3/2003 | King et al. ................... 711/165 |
| 6,675,176 | B1 | * | 1/2004 | Shinkai et al. .............. 707/200 |
| 6,728,922 | B1 | * | 4/2004 | Sundaram et al. ........... 714/769 |
| 6,742,137 | B1 | * | 5/2004 | Frey, Jr. ........................ 714/6 |
| 6,851,082 | B1 | * | 2/2005 | Corbett ........................ 714/770 |

* cited by examiner

*Primary Examiner*—Hong Kim
(74) *Attorney, Agent, or Firm*—Suiter West Swantz PC LLO

(57) ABSTRACT

The present invention is a method and system for associating metadata with user data in a storage array in a manner that provides independence between metadata management and a storage controller's cache block size. Metadata may be associated with user data according to multiple fashions in order to provide a desired performance benefit. In one example, the metadata may be associated according to a segment basis to maximize random I/O performance and may be associated according to a stripe basis to maximize sequential I/O performance.

15 Claims, 6 Drawing Sheets

METHOD FOR LOOSELY COUPLING METADATA AND DATA IN A STORAGE ARRAY

FIELD OF THE INVENTION

The present invention generally relates to the field of high availability storage arrays, and more particularly to a method and system for associating metadata and related user data of a storage array that provides independence between metadata management and a storage controller's cache block size.

BACKGROUND OF THE INVENTION

Reliable storage and the utilization of high availability storage arrays employing disk drives as the storage media are becoming evermore popular as data is stored electronically. Data is stored to, and retrieved from, an array of disks on the behalf of one or more host computer systems by storage controllers. A major requirement of storage systems is the transfer and retrieval of data without error. Thus, storage systems and storage array controllers employ error detection and recovery algorithms to ensure data integrity.

Known to the art are Redundant Array of Independent Disks (RAID) parity schemes which may be utilized to provide error detection during the transfer and retrieval of data across a storage system. In addition to RAID parity schemes, a storage array controller may utilize some sort of error and detection code to provide additional path and/or drive anomaly protection. Data path and drive anomaly protection schemes typically employ some form of metadata that is stored on disk drives along with user data. This may require that the metadata is managed on a per input/output (I/O) basis. Further, each time user data is read from or written to media, the accompanying metadata must also be read from or written to media.

An approach known to the art for managing metadata involves interleaving metadata with the user data utilizing a 512-byte sector format. Generally, metadata is interleaved with the user data at fixed intervals, for example, a segment of user data may be followed by a sector of metadata. Typically, the size of the user data block in each interval matches the size of the cache block used to manage a storage controller's data cache. This allows the user data and the metadata for a given cache block to be picked up with a single read directed to that cache block.

A drawback associated with interleaving user data with metadata on a cache block basis is the impracticality associated with changing a storage controller's cache block size once a volume is created. In normal operation, a storage controller may change its cache block size to optimize application performance without impacting data layout on the drives. However, the data layout on the drives must be altered if the size of the cache block is changed when metadata is interleaved with user data. This temporarily decreases application performance and the overall performance of a storage controller while the data layout is being reconfigured. Consequently, a method and system of associating metadata with user data in a manner that allows metadata management to be independent of a storage controller's cache block size is necessary.

SUMMARY OF THE INVENTION

Accordingly, the present invention is directed to a method and system for coupling metadata with user data in a manner that provides independence between metadata management and a storage controller's cache block size. In an embodiment of the invention, metadata is associated with user data according to a desirable scheme that allows adjustment in a size of a cache block without an accompanied requirement of altering the data layout on the drives. Advantageously, the scheme of associating metadata with user data of the present invention may provide for maximizing input/output (I/O) performance in multiple ways.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
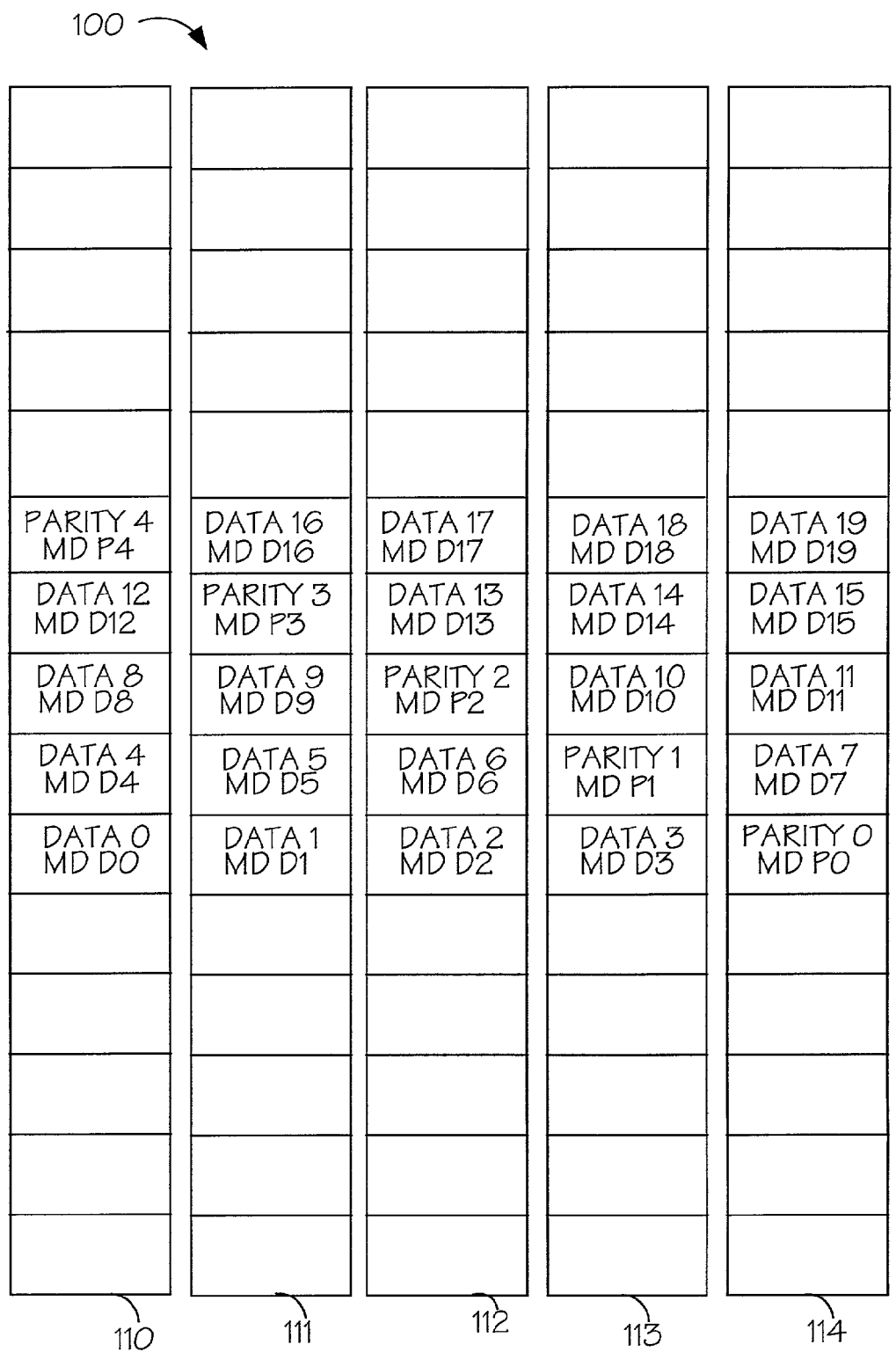
FIG. 1 depicts an embodiment of interleaving metadata with user data known to the art.

Referring to FIG. 1, an embodiment of a memory layout data structure 100 known to the art depicting the interleaving of metadata with user data across a storage array is shown. The memory layout data structure 100 across the storage array is representative of a RAID 5 mass storage system and includes drives 110–114. Memory layout data structure 100 may also be representative of other types of RAID mass storage systems and other forms of mass storage. Memory layout data structure 100 includes user data and its related metadata. In the memory data layout structure 100, metadata is interleaved with its related user data to form a pattern of repetitive user data/metadata blocks. For example, on drive 111 of memory layout data structure 100, a data block 16 (DATA 16) is positioned adjacent to metadata (MD D16) for data block 16.

A storage controller that controls the operation of the drives typically includes a data cache. Generally, the size of the user data block matches the size of the data cache of the storage controller. In order to optimize application performance, the size of the data cache of the storage controller may be adjusted. However, changing a storage controller's cache block size requires reformatting of the data on all of the drives 110–114 of the memory layout data structure 100 due to the interleaving of metadata with user data.

Figure 2:
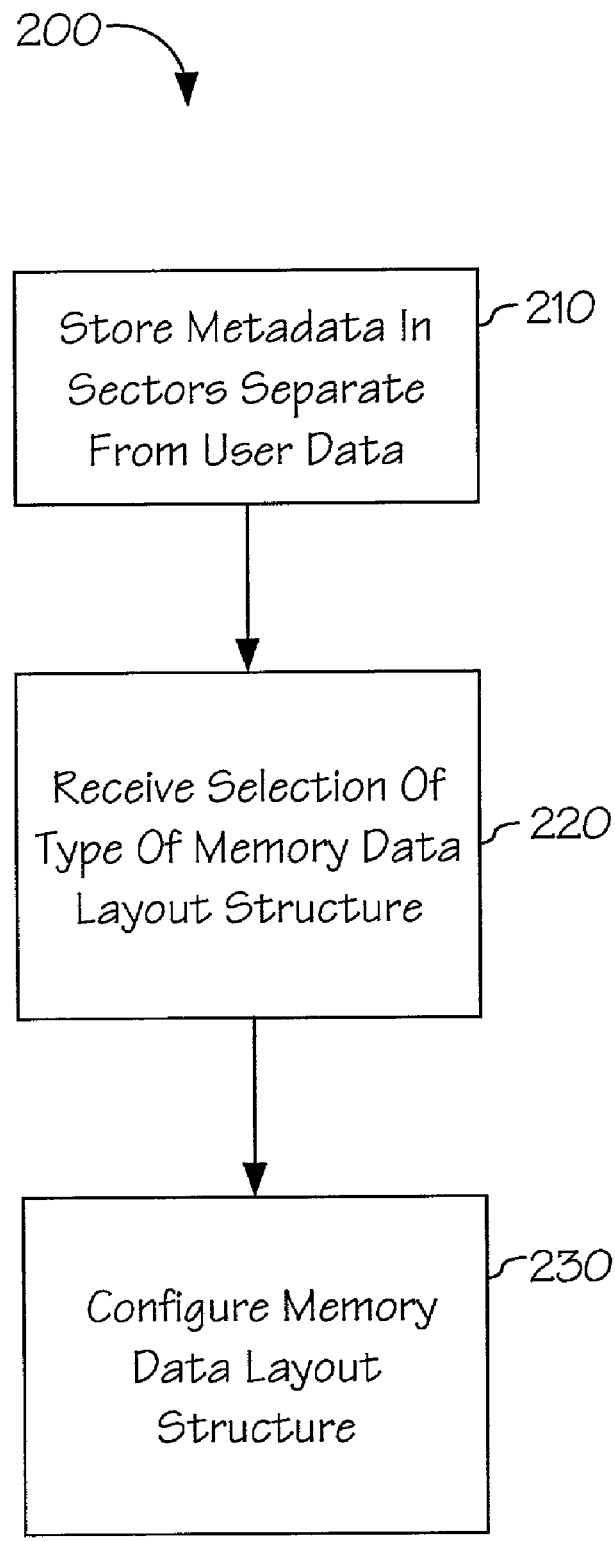
FIG. 2 depicts an embodiment of a process for configuring metadata with user data on a storage array in a manner that allows metadata management to be independent of a storage controller's cache block size.

Referring now to FIG. 2, an embodiment of a process 200 for forming a memory data layout structure in accordance with the present invention is shown. In an embodiment of the invention, the memory data layout structure of the present invention may associate metadata with related user data in a manner that allows metadata management to be independent of a storage controller's cache block size. Process 200 begins by the storing of metadata into sectors separate from user data 210. In one embodiment of the invention, each sector of metadata may be related to a particular user data block.

Many embodiments of memory data layout structures may be utilized in accordance with the present invention, each employing a unique association scheme for metadata and related user data. For example, each embodiment may provide unique advantages relating to the optimal I/O performance while removing the requirement of a change to the data layout upon a change in a controller's cache block size. Consequently, the process 200 may be capable of receiving a selection of a type of memory data layout structure 220. In an alternative embodiment of FIG. 2, receipt of a selection may not be required as a particular embodiment of a memory data layout structure may be produced upon execution of the process 200. Configuration of a memory data layout structure is performed according to the desired scheme 230. Configuration of the memory data layout structure may include the placement of the user data blocks and the related metadata stored in sectors according to the desired scheme which associates metadata with the related user data. The configuration of the memory data layout structure may provide independence in metadata management and a controller's cache block size.

An advantageous aspect of the present invention is the ability to configure a memory data layout structure in multiple fashions to achieve desired results. The memory data layout structure of the present invention may preserve a 512-byte drive sector format, however, it should be understood by those with ordinary skill in the art that other formats may be employed without departing from the scope and spirit of the present invention. A requirement of the invention may be that a sector of metadata is not stored adjacent to a related user data block to ensure proper execution of a drive anomaly protection algorithm.

Figure 3:
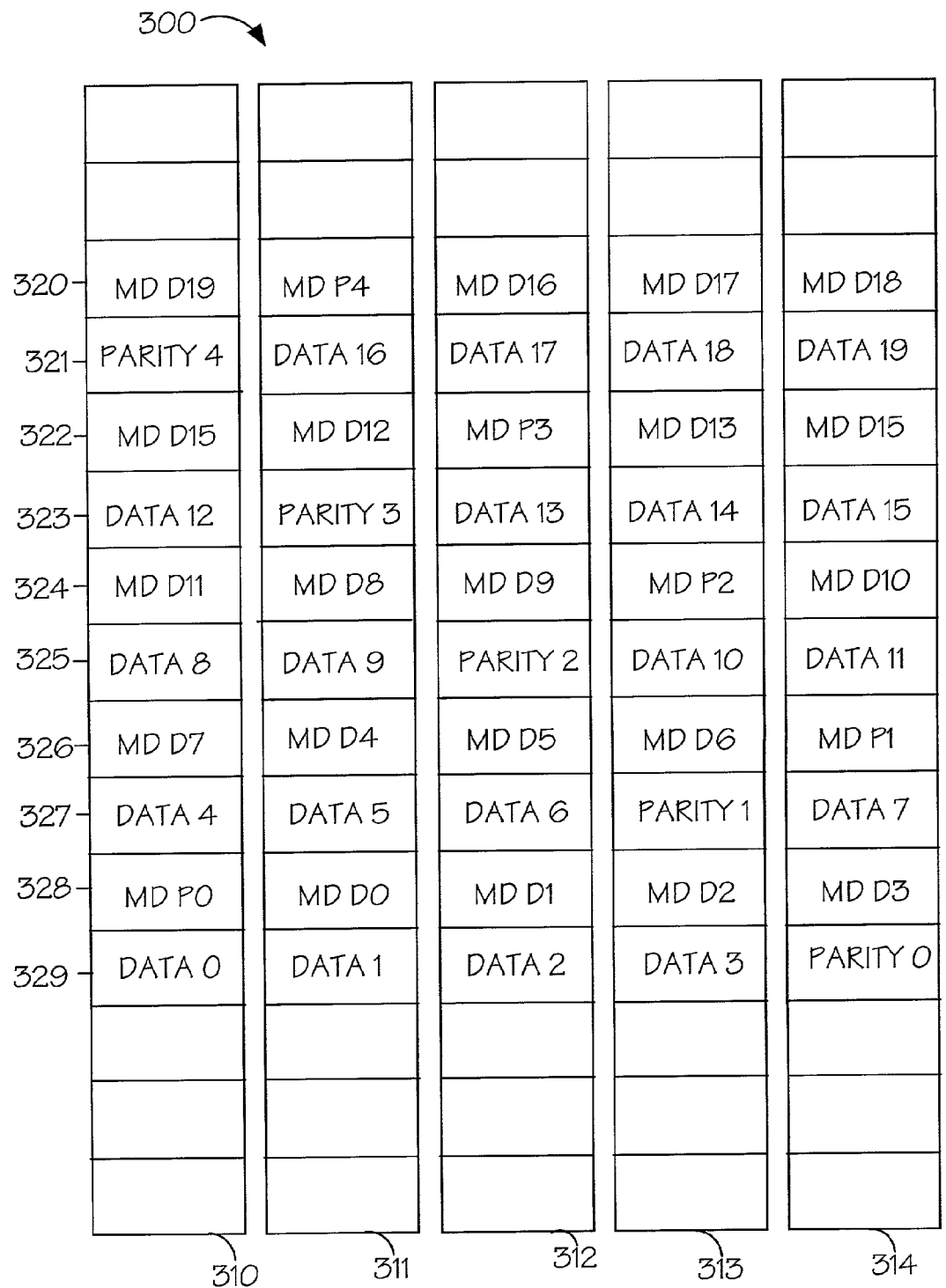
FIG. 3 depicts an embodiment of a memory layout data structure in which metadata and user data are associated according to a segment basis.

Referring to FIG. 3, an embodiment of a memory layout data structure 300 in which metadata and user data are associated according to a segment basis is shown. In an embodiment of the present invention, metadata may be associated with user data on an arbitrary basis, such as a segment or stripe, to provide a particular performance benefit. Data layout structure 300 may include disk drives 310–314. Each disk drive 310–314 may include segments 320–329 which include user data blocks, parity blocks, and metadata blocks. Data layout structure 300 may employ an association in which metadata for each segment is stored on an adjacent drive. Additionally, the association may include a stripe of metadata being adjacent to the related user data stripe. For example, metadata for datablock 16 (MD D16) is located in an adjacent drive and adjacent stripe to data block 16 (DATA 16). This may be advantageous as it may prevent corruption of both user data and metadata on a single drive read or write operation.

Another benefit of associating user data and metadata on an arbitrary basis may be the preservation of small seek range read performance. For example, associating user data and metadata on a segment basis as shown in FIG. 3 may maximize random I/O performance. This may be accomplished as a result of the form of data access. For instance, applications typically do not access data randomly across an entire volume. If an application accesses data over a third of the volume, associating metadata with user data on a segment basis may preserve the performance benefit of interleaving without increasing the drive seek range. Similarly, associating user data and metadata on a stripe basis (not shown) may maximize sequential I/O performance. Through the association of metadata and userdata on a segment basis, or larger granularity, the benefits of loosely coupling user data and metadata may be maintained.

Figure 4:
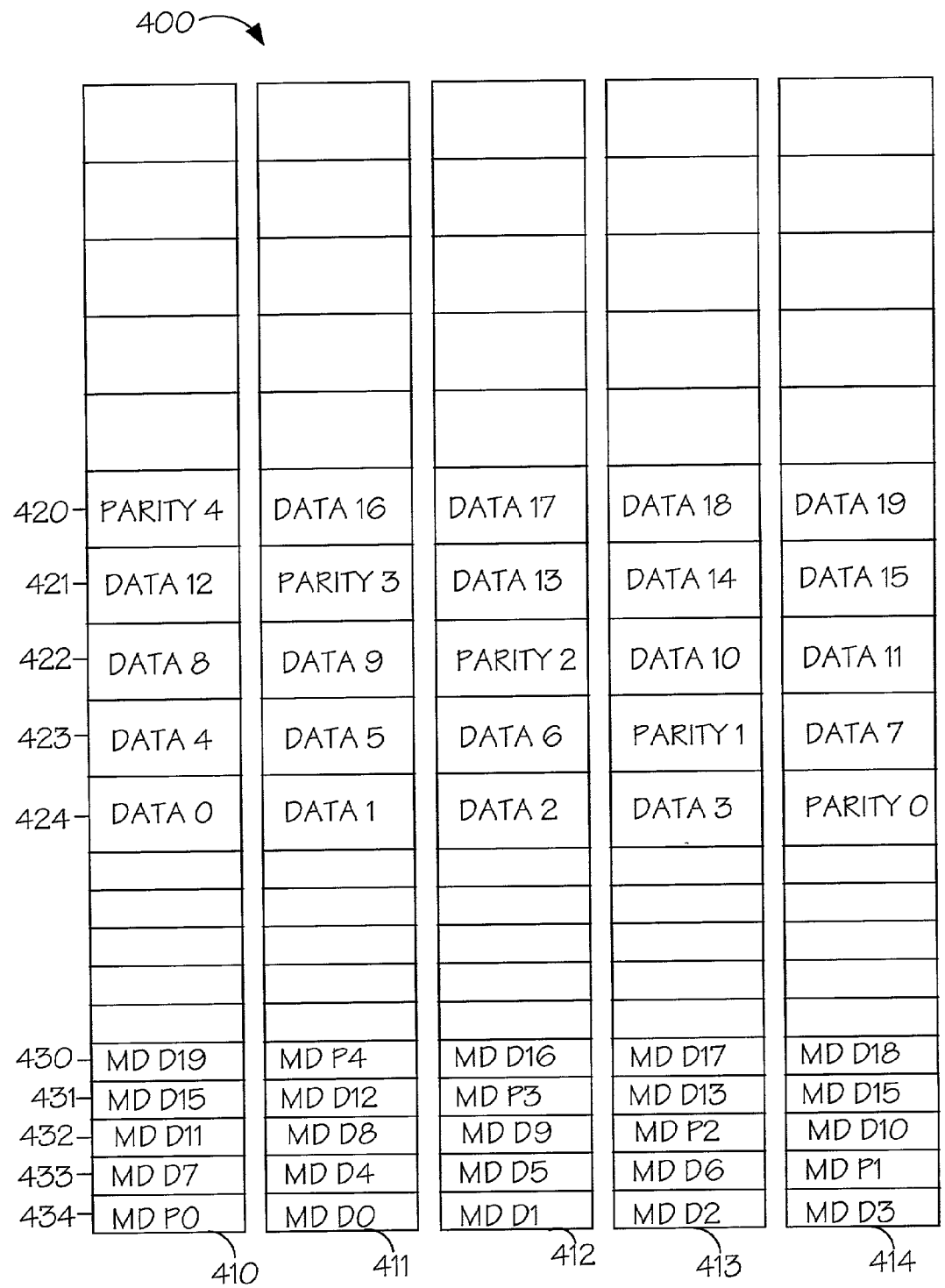
FIG. 4 depicts an embodiment of a memory layout data structure in which metadata and user data are separated.
Figure 5:
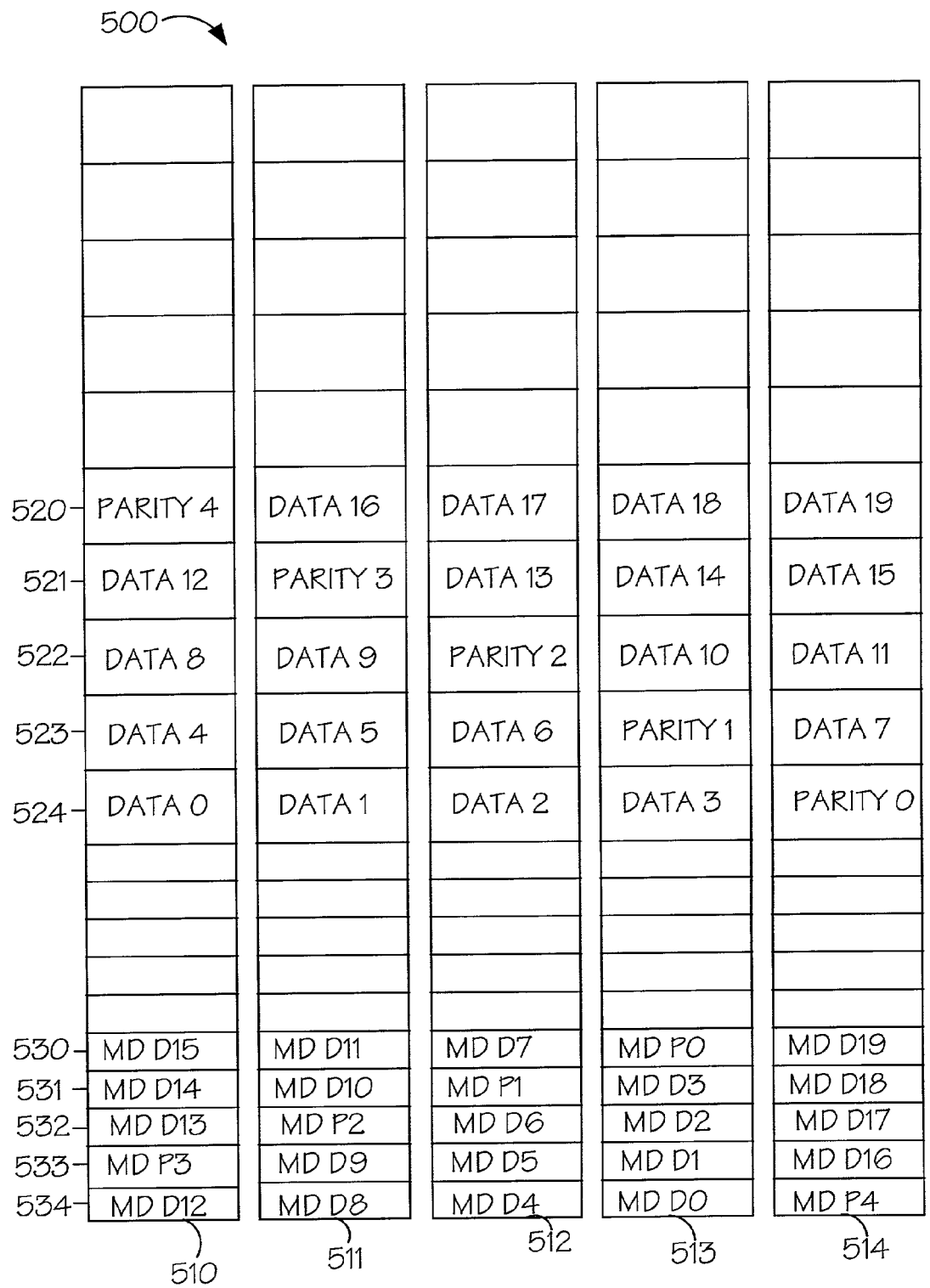
FIG. 5 depicts an alternative embodiment of a memory layout data structure in which metadata and user data are separated.

Referring to FIGS. 4 and 5, the memory data layout structure of the present invention may include sectors of metadata that are separated from related user data blocks. The configurations as shown in FIGS. 4 and 5 may be exemplary embodiments of loosely coupling user data and metadata in accordance with the present invention. Referring specifically to FIG. 4, an embodiment of a memory data layout structure 400 of the present invention in which metadata and user data are separated is shown. Data layout structure 400 may include disk drives 410–414. Each disk drive 410–414 may include segments 420–424 which include user data blocks and parity blocks. Disk drives 410–414 may also include sectors 430–434 which include metadata. In one embodiment of the invention, layout data structure may be formed as part of a storage array representative of a RAID 5, 4+1, 64 kilobyte segment array. Data layout structure 400 may employ an association in which metadata for each segment is stored on an adjacent drive. This may be advantageous as it may allow user data and its associated metadata to be obtained in parallel from separate drives. Since the metadata and related metadata have not been interleaved as shown in FIG. 1, the data layout structure 400 does not require adjustment of the data layout upon a change in the cache block size of a storage controller. This may provide independence for the metadata management with respect to a controller's cache block size.

Referring now to FIG. 5, an alternative embodiment of a memory data layout structure 400 of the present invention in which metadata and user data are completely separated is shown. Data layout structure 500 may include disk drives 510–514. Each disk drive 510–514 may include segments 520–524 which include user data blocks and parity blocks. Disk drives 510–514 may also include sectors 530–534 which store metadata. In one embodiment of the invention, layout data structure of the storage array may be representative of a RAID 5, 4+1, 64 kilobyte segment data layout structure. Data layout structure 500 may employ an association in which metadata for each stripe is stored on a drive adjacent to the respective parity drive. Data layout structure 500 may provide better performance for sequential and large I/O profiles than that provided by data layout structure 400. For these I/O profiles, it is likely that metadata will be accessed for adjacent user segments. In this case, metadata management for data layout structure 500 will likely require fewer drive I/O operations than that required for data layout structure 400. Similar to memory data layout structure 400, data layout structure 500 does not require adjustment of the data layout upon a change in the cache block size of a storage controller.

Data layout structure 300, 400 and 500 of FIGS. 3–5 each includes metadata blocks relating to user data blocks and parity blocks. In an embodiment of the invention, metadata may refer to cyclic redundancy code (CRC) information. It should be understood by those with ordinary skill in the art that other types of error and detection code information may be utilized as metadata in accordance with the present invention without departing from the scope and spirit of the present invention.

Figure 6:
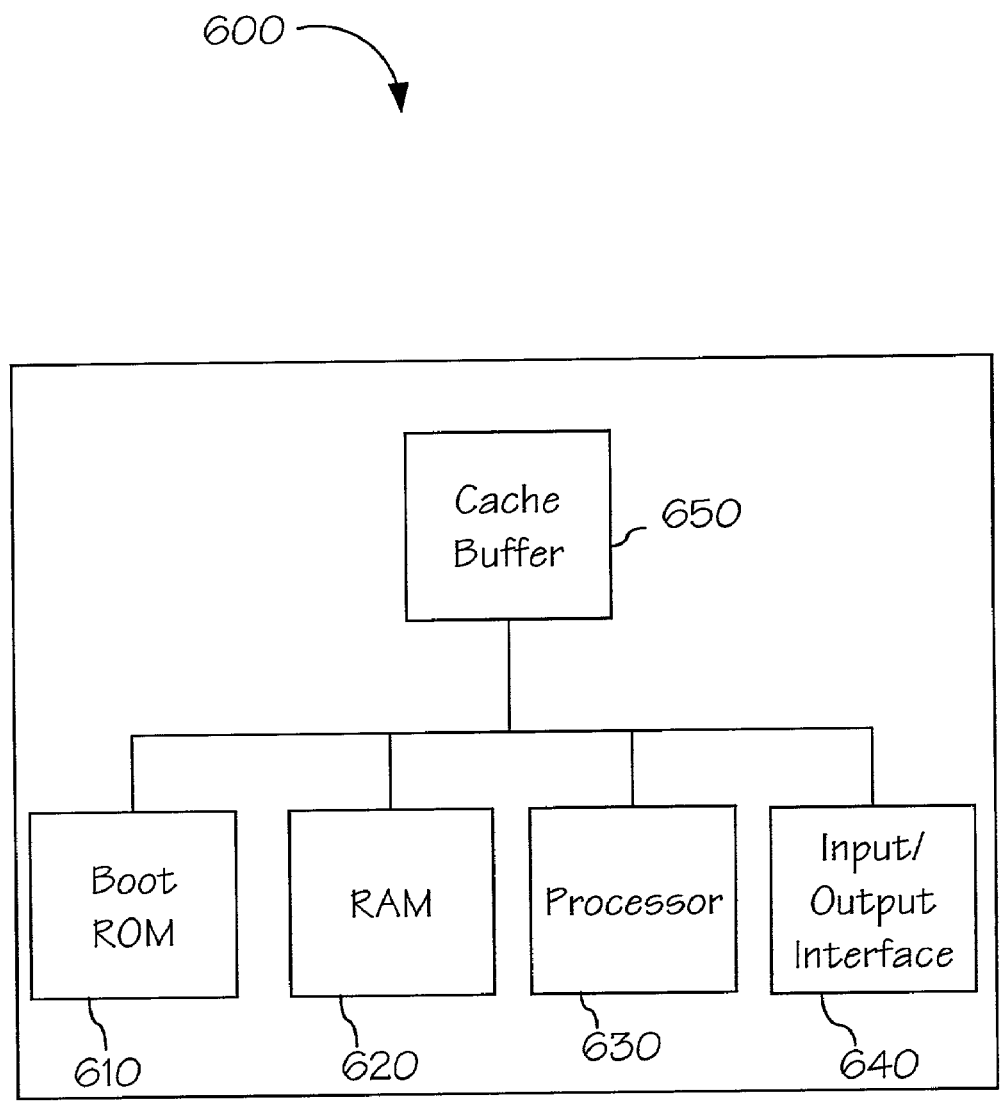
FIG. 6 depicts an embodiment of a storage controller of the present invention.

Referring now to FIG. 6, an embodiment of a storage controller 600 of the present invention is shown. In one embodiment of the invention, storage controller 600 may implement process 200 for preparing a memory data layout structure of the present invention. Storage controller 600 may include boot read only memory (ROM) 610, random access memory (RAM) 620, processor 630, input/output interface 640, and a cache buffer 650. Input/output interface may receive/deliver data according to a desired protocol. Processor 630 may execute a program of instructions which may execute steps as shown in process 200. It should be understood by those with ordinary skill in the art that process 200 may be implemented by other means than storage controller 600 without departing from the scope and spirit of the present invention.

In an embodiment of the invention, storage controller 600 of the present invention may be coupled to each drive 310–314, 410–414 and 510–514 as shown in FIGS. 3–5. Storage controller 600, in the execution of process 200 of the present invention, may prepare a memory data layout structure as shown in FIGS. 3–5 of the present invention. It should be understood by those with ordinary skill in the art that memory data layout structure of the present invention may be prepared without the use of storage controller 600 and would not depart from the scope and spirit of the present invention.

It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for configuring a storage system including a storage controller and a storage disk array with multiple drives, comprising:
   (a) storing user data in a plurality of segments in a storage disk array with multiple drives, said plurality of segments including a first user data segment and a second user data segment;
   (b) storing metadata in a plurality of segments in said storage disk array with multiple drives, said metadata being error and detection code information for said user data, said plurality of segments including a first metadata segment and a second metadata segment; and
   (c) associating said plurality of segments of metadata with said plurality of segments of user data, wherein said first metadata segment is metadata only for said first user data segment, said second metadata segment is metadata only for said second user data segment, said first metadata segment being located in a first drive, said first user data segment being located in a drive adjacent to said first drive, said second metadata segment being located in a second drive, said second user data segment being located in a drive adjacent to said second drive.

2. The method as claimed in claim 1, wherein association of said segments of metadata with said segments of user data maximizes random input/output performance of said storage system.

3. The method as claimed in claim 1, wherein said segments of metadata are stored in a separate section of said storage disk array from a section including multiple user data segments.

4. The method as claimed in claim 1, wherein a change of a cache block size of said storage controller is independent of a memory data layout structure on said storage disk array.

5. The method as claimed in claim 1, whereby said segments of metadata are stored in a stripe, said segments of related data being stored in an adjacent stripe to said stripe.

6. The method as claimed in claim 1, wherein said error and detection code is cyclic redundancy code information.

7. A method for configuring a storage system including a storage controller and a storage disk array with multiple drives, comprising:
   (a) storing user data in a plurality of blocks in a storage disk array with multiple drives, said plurality of blocks including a first user data block and a second user data block;
   (b) storing metadata in a plurality of sectors, said metadata being error and detection code information for said user data, said plurality of sectors including a first metadata sector and a second metadata sector, said first metadata sector being within a first stripe of said storage disk array, said second metadata sector being within a second stripe of said storage disk array; and
   (c) associating each sector of metadata with a related user data block whereby said first metadata sector is metadata only for said first user data block, said second metadata sector is metadata only for said second user data block, said first user data block being located in a stripe adjacent to said first stripe, said second user data block being located in a stripe adjacent to said second stripe and whereby sequential input/output performance of said storage system is maximized.

8. The method as claimed in claim 7, wherein a change of said cache block size of said storage controller is independent of a memory data layout structure on said storage disk array.

9. The method as claimed in claim 7, wherein said error and detection code is cyclic redundancy code information.

10. A system for configuring a storage system including a storage controller and a storage disk array with multiple drives, comprising:
   (a) means for storing user data in a plurality of blocks in a storage disk array with multiple drives, said plurality of blocks including a first user data block and a second user data block;
   (b) means for storing metadata in a plurality of sectors, said metadata being error and detection code information for said user data, said plurality of sectors including a first metadata sector and a second metadata sector; and
   (c) means for associating each sector of metadata with a related user data block according to a desired scheme to produce a memory data layout structure on said storage disk array; whereby said first metadata sector is metadata only for said first user data block, said second metadata sector is metadata only for said second user data block, said first metadata sector being located in a first drive, said first user data block being located in a drive adjacent to said first drive, said second metadata sector being located in a second drive, said second user data block being located in a drive adjacent to said second drive and said each sector of metadata and said related data block is suitable for retrieval in parallel from separate drives.

11. The system as claimed in claim 10, wherein said desired scheme maximizes random input/output performance of said storage system.

12. The system as claimed in claim 10, wherein said plurality of sectors of metadata are stored in a separate section of said storage disk array from a section including multiple user data blocks.

13. The system as claimed in claim 10, whereby said each sector of metadata is stored in a stripe, said segment of related data being stored in an adjacent stripe to said stripe.

14. The system as claimed in claim 10, wherein a change of said cache block size of said storage controller is independent of said memory data layout structure on said storage disk array.

15. The system as claimed in claim 10, wherein said error and detection code is cyclic redundancy code information.

* * * * *